US012730708B2

(12) United States Patent
Gohain et al.

(10) Patent No.: US 12,730,708 B2
(45) Date of Patent: Sep. 8, 2026

(54) PROGRAM FAILURE HANDLING IN NON-VOLATILE MEMORY SYSTEMS

(71) Applicant: Micron Technology, Inc., Boise, ID (US)

(72) Inventors: Nitul Gohain, Bangalore (IN); Chao-Han Cheng, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/790,154

(22) Filed: Jul. 31, 2024

(65) Prior Publication Data

US 2026/0037368 A1 Feb. 5, 2026

(51) Int. Cl.
*G06F 11/10* (2006.01)

(52) U.S. Cl.
CPC ................................ *G06F 11/1004* (2013.01)

(58) Field of Classification Search
CPC .................................................. G06F 11/1004
See application file for complete search history.

(56) References Cited

U.S. PATENT DOCUMENTS 6,539,503 B1 * 3/2003 Walker ................ G06F 11/2215 714/41
8,291,295 B2 * 10/2012 Harari ................ G06F 11/1068 714/763
10,642,727 B1 5/2020 Volpe et al.
2012/0311237 A1 * 12/2012 Park .................... G06F 12/0246 711/E12.008
2015/0127973 A1 * 5/2015 Porterfield .......... G06F 11/1004 714/6.13
2015/0370669 A1 12/2015 Tressler et al.
2016/0225461 A1 8/2016 Tuers et al.
2016/0342363 A1 11/2016 Krause
2019/0179740 A1 6/2019 Ware et al.
2021/0200635 A1 * 7/2021 Cariello .............. G06F 11/1068
2024/0311023 A1 * 9/2024 Linnen .................. G06F 3/0619
2024/0329865 A1 * 10/2024 Thirumalai ............. G06F 3/065

OTHER PUBLICATIONS

"International Search Report and Written Opinion of the International Searching Authority," issued in connection with Int'l Appl. No. PCT/US2025/039300, dated Nov. 19, 2025 (12 pages).

* cited by examiner

*Primary Examiner* — Albert Decady
*Assistant Examiner* — Enamul M Kabir
(74) *Attorney, Agent, or Firm* — Holland & Hart LLP

(57) ABSTRACT

Methods, systems, and devices for program failure handling in non-volatile memory systems are described. The memory system may identify a program failure associated with writing data to a first address of a first block of memory cells. The memory system may move data from the first block to a second block of memory cells based on identifying the program failure at the first address. The memory system may alter the data stored to the second block to include an uncorrectable error after moving the data from the first block. The memory system may perform a redundant array of independent NAND (RAIN) operation on the altered data stored to the second block. In some examples, the RAIN operation may include correcting the uncorrectable error stored to the second block and moving the data from the second block to a third block of memory cells.

34 Claims, 9 Drawing Sheets

PROGRAM FAILURE HANDLING IN NON-VOLATILE MEMORY SYSTEMS

TECHNICAL FIELD

The following relates to one or more systems for memory, including program failure handling in non-volatile memory systems.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
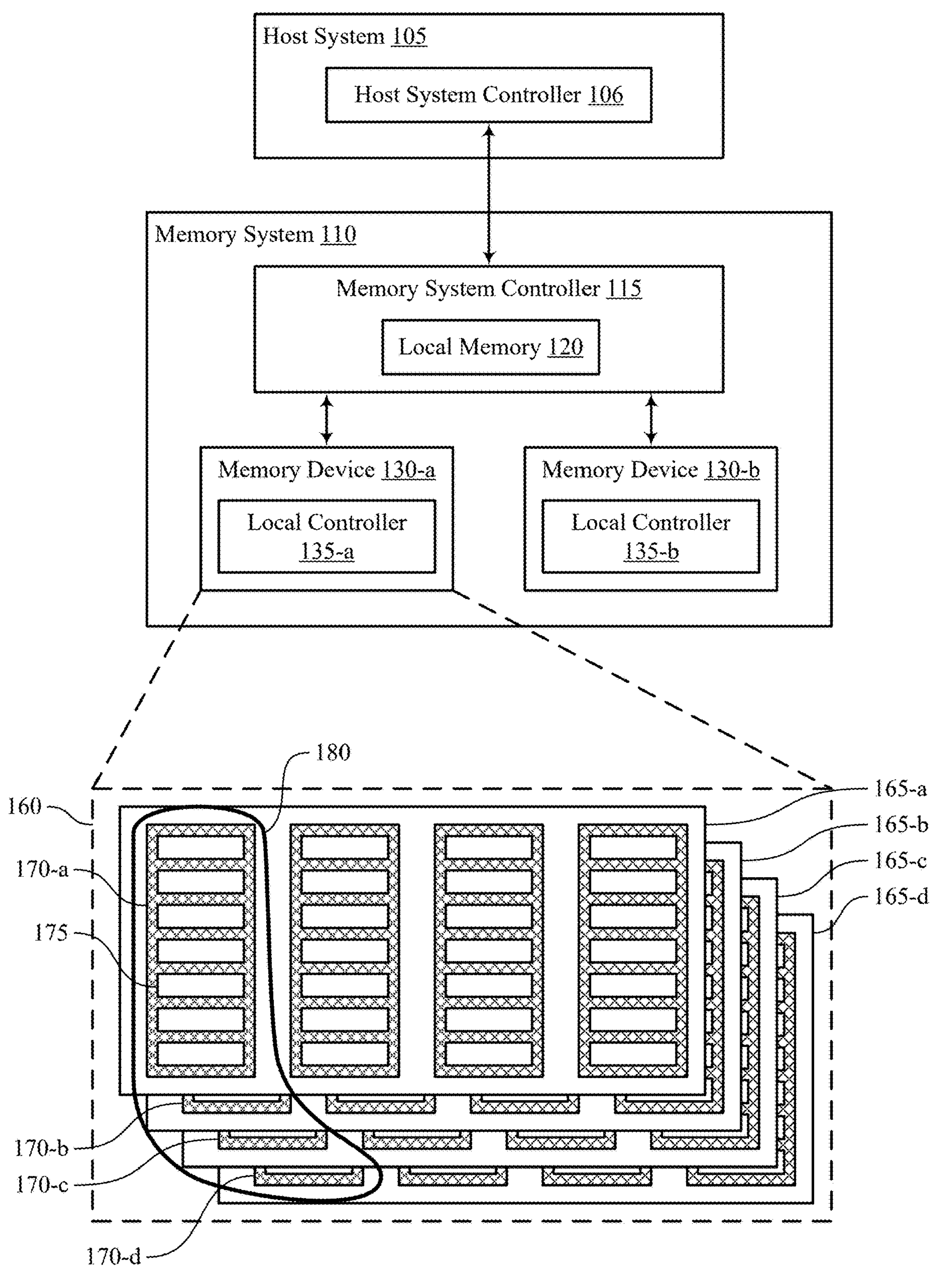
FIG. 1 shows an example of a system that supports program failure handling in non-volatile memory systems in accordance with examples as disclosed herein.

In some examples, a memory system may receive one or more write commands from an associated host system indicating to write data to a memory device of the memory system. As such, the memory system may program data to the memory device in accordance with receiving the write commands from the host system. In some cases, however, a program failure may occur during the write operation(s). In some examples, a program failure may be caused by physical defects of one or more memory cells of the memory device, or may otherwise result in invalid data being written. For instance, repeated write and erase cycles may degrade the memory cells, or the memory device may inherently include blocks that include defective memory cells. As such, if the memory system identifies a program failure at a first block of memory cells (e.g., a first physical address), the memory system may perform a maintenance operation on the first block (such as a redundant array of independent NAND (RAIN) operation) to recover the data. In some examples, the memory system may postpone performing any write operations until the program failure at the first block is resolved. In some cases, however, it may be undesirable to postpone performing write commands that are queued (e.g., stored to a command queue of the memory system). For instance, NAND devices such as automotive solid-state drives (SSDs) may incur relatively high latency by postponing commands stored to the command queue. Such increases in latency may degrade the overall performance of the memory system.

In some examples, a memory system may reduce latency associated with handling program failures by operating in accordance with the techniques described herein. For example, if the memory system identifies a program failure at a first block, the memory system may postpone performing commands stored to a queue command, may identify an unused second block, and move any valid (e.g., good) data stored at the first block to the second block. Additionally, after moving the valid data the second block, the memory system may alter the data at the second block by injecting an error into the data (such as an uncorrectable error). After moving the valid data from the first block to the second block, the memory system may resume operations stored to the command queue. In some examples, a first duration associated with moving data to the second block may be less than a second duration of time to perform a maintenance operation on the first block. As such, the memory system may reduce the latency associated with postponing commands stored to the command queue for program failure handling.

Additionally, the error injected into the second block may trigger the memory system to perform a maintenance operation after the write commands of command queue are completed. For example, during a read operation associated with the second block, the memory system may identify the error and determine to perform a RAIN operation on the second block, and the data may be moved from the second block to a third block (e.g., as part of the RAIN operation). As such, the memory system may reduce latency associated with postponing commands stored to the command queue during program failure, while correcting the data associated with the program failure. Such techniques may improve the overall performance of the memory system.

In addition to applicability in memory systems as described herein, techniques for program failure handling in non-volatile memory systems may be generally implemented to improve the performance of various electronic devices and systems (including artificial intelligence (AI) applications, augmented reality (AR) applications, virtual reality (VR) applications, gaming, and automotive operations). Some electronic device applications, including high-performance applications such as AI, AR, VR, gaming, and automotive operations may be associated with relatively high processing requirements to satisfy user expectations.

As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by improving memory speeds during write operations, which may decrease processing or latency times, improve response times, or otherwise improve user experience, among other benefits.

Features of the disclosure are illustrated and described in the context of systems, devices, and circuits. Features of the disclosure are further illustrated and described in the context of processes and flowcharts.

FIG. 1 shows an example of a system 100 that supports program failure handling in non-volatile memory systems in accordance with examples as disclosed herein. The system 100 includes a host system 105 coupled with a memory system 110. The system 100 may be included in a computing device such as a desktop computer, a laptop computer, a network server, a mobile device, a vehicle, an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*. A local controller 135 may be or include a microcontroller, special purpose logic circuitry (e.g., a field programmable gate array (FPGA), an application specific integrated circuit (ASIC), a digital signal processor (DSP)), or any other suitable processor or processing circuitry.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The memory system 110 may receive one or more write commands from an associated host system 105 indicating to write data to a memory device 130 of the memory system 110. As such, the memory system 110 may program data to the memory device 130 in accordance with receiving the write commands from the host system 105. In some cases, however, a program failure may occur during the write operation(s). In some examples, a program failure may be caused by physical defects of one or more memory cells of the memory device 130, or may otherwise result in invalid data being written. For instance, repeated write and erase cycles may degrade the memory cells, or the memory device 130 may inherently include blocks 170 that include defective memory cells. As such, if the memory system 110 identifies a program failure at a first block 170 of memory cells (e.g., a first physical address), the memory system 110 may perform a maintenance operation on the first block (such as a RAIN operation). In some examples, the memory system 110 may postpone performing any write operations until the program failure at the first block 170 is resolved. In some cases, however, it may be undesirable to postpone performing write commands that are queued (e.g., stored to a command queue of the memory system 110). For instance, NAND devices such as automotive SSDs may incur relatively high latency by postponing commands stored to the command queue. Such increases in latency may degrade the overall performance of the memory system 110.

In some examples, a memory system 110 may reduce latency associated with handling program failures by operating in accordance with the techniques described herein. For example, if the memory system 110 identifies a program failure at a first block 170, the memory system 110 (e.g., the memory system controller 115) may postpone performing commands stored to a queue command, may identify an unused second block 170, and move any valid (e.g., good) data stored at the first block 170 to the second block 170. Additionally, after moving the valid data the second block 170, the memory system controller 115 may alter the data at the second block 170 by injecting an error into the data (such as an uncorrectable error). After moving the valid data from the first block 170 to the second block 170, the memory system 110 may resume operations stored to the command queue. In some examples, a first duration associated with moving data to the second block 170 may be less than a second duration of time to perform a maintenance operation on the first block 170. As such, the memory system 110 may reduce the latency associated with postponing commands stored to the command queue for program failure handling.

Additionally, the error injected into the second block 170 may trigger the memory system controller 115 to perform a maintenance operation after the write commands of command queue are completed. For example, during a read operation associated with the second block 170, the memory system controller 115 may identify the error and determine to perform a RAIN operation on the second block 170, and the data may be moved from the second block 170 to a third block 170 (e.g., as part of the RAIN operation). As such, the memory system 110 may reduce latency associated with postponing commands stored to the command queue during program failure, while correcting the data associated with the program failure. Such techniques may improve the overall performance of the memory system 110.

Figure 2:
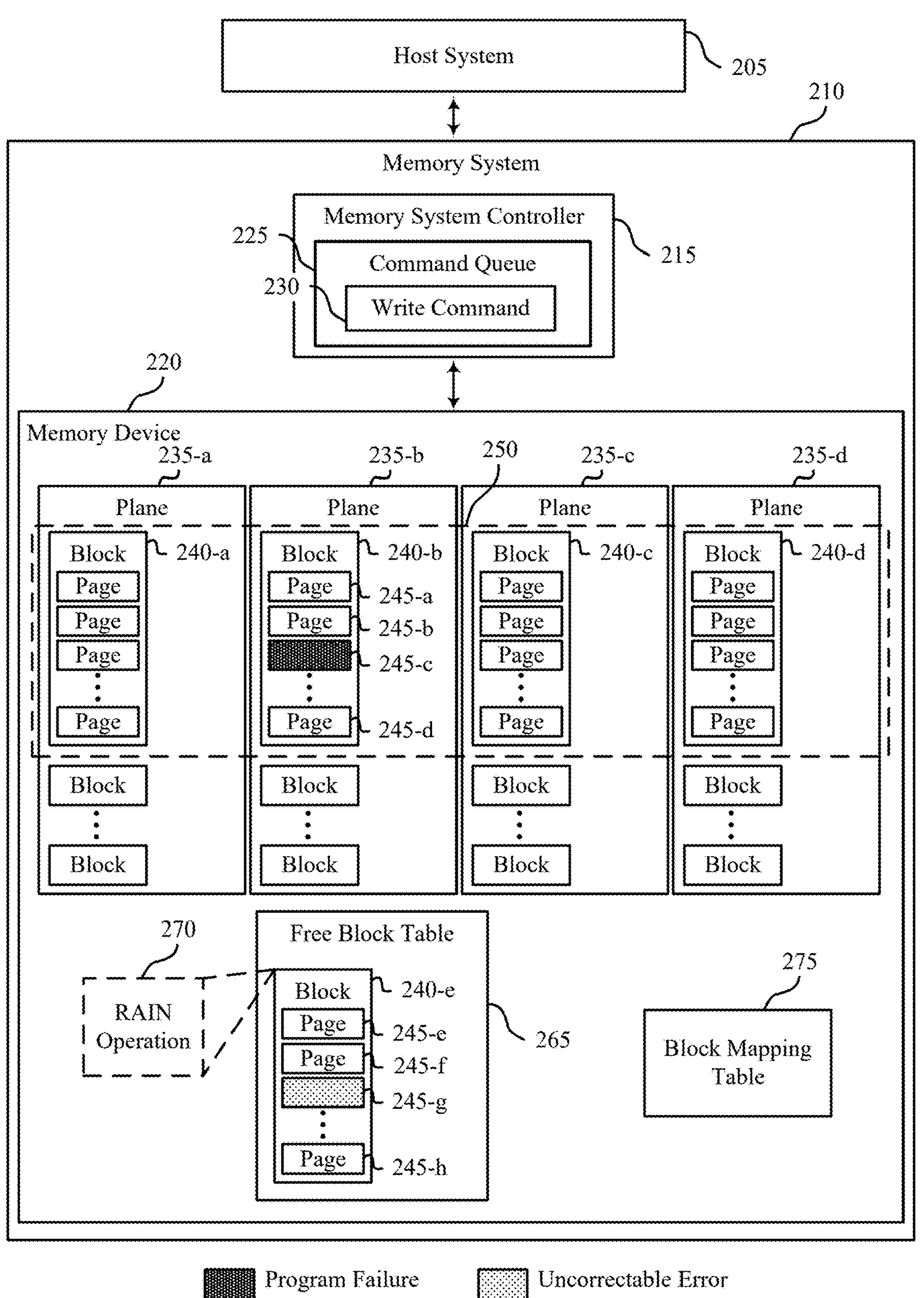
FIG. 2 shows an example of a system that supports program failure handling in non-volatile memory systems in accordance with examples as disclosed herein.

FIG. 2 shows an example of a system 200 that supports program failure handling in non-volatile memory systems in accordance with examples as disclosed herein. The system 200 may include a host system 205 and a memory system 210. In some instances, the memory system 210 may include a memory system controller 215 and a memory device 220, which may be examples of the corresponding devices described with respect to FIG. 1. In some examples, the memory system controller 215 may be configured to move data from a first block 240 to a second block 240 based on identifying a program failure 255 at the first block 240. In such examples, the memory system controller 215 may alter the data moved to the second block 240 to include uncorrectable error 260, which may trigger a RAIN operation 270 to be performed on the second block 240.

As illustrated in FIG. 2, the memory device 220 may include a set of planes 235 (e.g., plane 235-*a*, 235-*b*, 235-*c*, and 235-*d*). In some examples, the set of planes 235 may be a set of planes 165, as described with reference to FIG. 1. For instance, each plane 235 may include a respective set of blocks 240 (e.g., plane 235-*a* may include at least block 240-*a*, plane 235-*b* may include at least block 240-*b*, plane 235-*c* may include at least block 240-*c*, and plane 235-*d* may include at least block 240-*d*). As illustrated in FIG. 2 each plane 235 may include any quantity of blocks 240. Additionally, or alternatively, the memory device 220 may include a superblock 250, which may refer to one or more blocks 240 located across one or more planes 235. For example, as illustrated in FIG. 2, block 240-*a*, 240-*b*, 240-*c*, and 240-*d* may be included in the superblock 250, where the superblock 250 spans plane 235-*a*, 235-*b*, 235-*c*, and 235-*d*. In some examples, the memory device 220 may map respective blocks 240 to a given superblock 250 using a block mapping table 275. For instance, the block mapping table 275 may include a table that indicates that blocks 240-*a* through 240-*d* are included in the superblock 250. The block mapping table 275 may include multiple respective mappings of sets of blocks 240 to respective superblocks 250.

In some cases, the memory device 220 may include one or more different types of blocks 240 or may operate one or more blocks 240 differently. For example, the memory device 220 may include cache blocks 240 which may act as a high-speed buffer between the host system 205 and the memory device 220. For instance, the cache blocks 240 may store data that is accessed relatively frequently (e.g., above a frequency threshold) or data that the memory system 210 anticipates to be accessed within a time threshold (e.g., data that may be consistently accessed at the memory device 220). Additionally, or alternatively, meta blocks 240 may include meta data stored to the memory device 220. For instance, the meta blocks 240 may include mapping tables (e.g., logical-to-physical (L2P) address mappings), wear-leveling information, error correction data, block usage statistics, and other management information. Additionally, or alternatively, garbage collection blocks 240 may facilitate garbage collection operations for removing invalid data form the memory device 220. For instance, garbage collection operations may involve identifying and erasing blocks 240 that contain invalid data to free up space for new data. Additionally, or alternatively, system blocks 240 may store system-level information and firmware associated with operation of the memory device 220. For instance, system blocks 240 may include firmware, boot code, and other system data used for operation of the memory device 220.

In some examples, the blocks 240 included in each of the planes 235 may be respective examples of blocks 170 as described with reference to FIG. 1. For instance, each block 240 may include a set of pages 245 (e.g., block 240-*b* may include page 245-*a*, 245-*b*, 245-*c*, and 245-*d*). As illustrated in FIG. 2, each block 240 may include any quantity of pages 245, where each page 245 includes a respective set of memory cells for storing data at the memory device 220. That is, the pages 245 may be examples of pages 175, as described with reference to FIG. 1. Additionally, each of the memory cells included in the set of pages 245 may be examples of SLCs (e.g., used to store one bit of information), MLCs (e.g., used to store two bits of information), TLCs (e.g., used to store three bits of information), QLCs (e.g., used to store four bits of information), or a combination thereof. Additionally, or alternatively, each page 245 may be associated with a physical block address (PBA) that is mapped to a respective LBA. For instance, a PBA may represent a physical hardware location of the memory cells of a page 245, and an LBA may be a logical abstraction that points to the PBA for a given page 245. In some examples, accessing data from a PBA using the associated LBA may utilize an entry or record that assigns a mapping between each LBA and each PBA (e.g., an L2P table).

As illustrated in FIG. 2, the host system 205 may write data to the memory device 220 in accordance with transmitting one or more commands (e.g., write commands 230). For example, the memory system controller 215 may receive a write command 230 that indicates data to be written to a set of LBAs that correspond to a set of pages 245 that span one or more blocks 240. As such, the memory system controller 215 may receive the set of write commands 230 at a command queue 225. While FIG. 2 illustrates a single write command 230 at the command queue 225, it is understood that the command queue 225 may store multiple write commands 230 that the memory system controller 215 receives from the host system 205.

As such, the memory system controller 215 may program data at the memory device 220 in accordance with receiving the write command 230 from the host system 205. In a first example, the write command 230 may be associated with writing (e.g., programming or storing) data to multiple pages 245 of the superblock 250 (e.g., one or more pages 245 of block 240-*a*, 240-*b*, 240-*c*, 240-*d*, or a combination thereof). In some cases, however, a program failure 255 may occur while the memory system controller 215 programs the data in accordance with the write command 230. For instance, in the example of FIG. 2, a program failure 255 may occur while writing data to one or more memory cells of page 245-*c*. In some cases, a program failure 255 may result in data corruption, increased wear, and potential system instability.

Program failure 255 may occur at the memory device 220 based on one or more causes. For example, program failure 255 may be caused by a sudden power loss during a write operation which leaves the data in an incomplete state, a fault at the memory system controller 215, which may result in improper data handling, or interference from nearby operations or other devices that disrupt the write process. Additionally, or alternatively, program failure 255 may be caused by physical defects of one or more memory cells. For instance, repeated write and erase cycles may degrade the memory cells, the memory device 220 may inherently include blocks 240 that include defective memory cells (e.g., bad blocks 240), or both.

In some cases, the memory system controller 215 may address (e.g., handle, attempt to correct) a program failure 255 by using one or more error correction techniques. For example, RAIN may be a technique used in flash memory storage systems to improve reliability and data integrity by recovering data that includes an error due to a program failure. In accordance with RAIN techniques, the memory system controller 215 may use redundancy to recover data in the case of memory cell failures, which may ensure that data remains intact even if some parts of the memory device 220 become faulty. For instance, in accordance with RAIN, data may be divided into stripes with each stripe including one or more data blocks 240 and one or more parity blocks 240. As such, if a data block 240 becomes corrupted or unreadable, the memory system controller 215 may use the parity information (e.g., stored at the parity blocks 240) and the remaining data blocks 240 to reconstruct the lost data.

In some examples, the memory system controller 215 may calculate the parity information stored at the parity blocks 240 by using techniques such as exclusive-or (XOR) operations on the data blocks 240. In some examples, RAIN techniques may be associated with different levels (e.g., different RAIN levels). For example, RAIN-0 may stripe data across multiple NAND chips without redundancy (e.g., offering an increase in performance but no data protection). In accordance with RAIN-1, the memory system controller 215 may mirror data across multiple NAND chips (e.g., providing an increase in redundancy and reliability). In accordance with RAIN-5, the memory system controller 215 may use block-level striping with distributed parity (e.g., offering an increase in performance, storage efficiency, and data protection). In some examples, the memory system controller 215 may calculate and store RAIN parity information at a RAM of the memory system controller 215. Additionally, or alternatively, the RAIN parity information may be written to a volatile memory (e.g., SRAM) of the memory system controller 215 prior to identifying a program failure 255 at the memory device 220.

In some cases, the memory system controller 215 may determine to perform RAIN recovery in response to identifying a program failure 255 (e.g., after a program failure 255 is identified). For instance, the memory system 210 may postpone queued command requests (e.g., write commands 230 at the command queue 225), perform the RAIN recovery on the block 240 that includes the program failure 255, and resume the in-queued command request after performing RAIN recovery (e.g., continue performing the write commands 230 at the command queue 225). In some cases, however, some types of memory systems 210 may incur relatively high latency by postponing in-queued requests and performing RAIN when (e.g., directly after) a program failure 255 is identified. For example, in cases of automotive SSDs, the memory system controller 215 may have multiple pending write operations at the command queue 225 associated with a plane 235 that experiences program failure 255, where performing RAIN recovery prior to completing the multiple pending write operations may increase latency for the memory system 210. Such increases in latency may reduce the overall performance of the memory system 210.

To reduce latency associated with identifying a program failure 255, the memory system 210 may operate in accordance with the techniques described herein. For example, the memory system controller 215 may perform one or more techniques in accordance with a type of block 240 experiencing program failure 255 (e.g., host system cache blocks 240, meta blocks 240, garbage collection blocks 240, or system blocks 240).

In examples where a program failure 255 occurs at a cache block 240 or a meta block 240, the memory system controller 215 may perform techniques of program failure 255 handling in accordance with a first implementation. For instance, in cases where a program failure 255 occurs, the memory system controller 215 may identify an address (e.g., PBA, LBA, or both) associated with the page 245 that experienced the program failure 255 (e.g., page 245-*c*, in the example of FIG. 2). In some examples, the memory system controller 215 may store the identified address to a queue associated with bad block handling (e.g., a firmware BadInfo queue). In response to storing the identified address to the queue, the memory system controller 215 may determine to rescue the non-damaged data (e.g., valid data) stored at the block 240-*b*. For example, the memory system controller 215 may identify an unused block 240 to store the valid data from the block 240-*b* to. For instance, the memory system controller 215 may identify a block 240-*e*, where the block 240-*e* may be identified (e.g., via an indicator) using a free block table 265.

In some examples, the free block table 265 may be referred to as an orphan block table, or may otherwise be a table that identifies unused (e.g., free) superblocks 250. Based on identifying block 240-*c*, the memory system controller 215 may move the valid data from block 240-*b* to block 240-*e* page-by-page. In some examples, the memory system controller 215 may read the valid data starting at an initial page 245 of block 240-*b* (e.g., page 245-*a*, or index [0]) and up to the failure page 245 (e.g., index [page 245-*c*]). In some examples, the memory system controller 215 may read the valid data page-by-page starting at an initial page 245 of block 240-*b* (e.g., page 245-*a*, or index [0]) and to up a page 245 subsequent to the failure page 245 (e.g., index [page 245-*c*+1]). In some examples, the memory system controller 215 issues a page read command to read the valid data from the block 240-*b* and issues a page program command to program (e.g., write) the valid data to the block 240-*c*. As illustrated in FIG. 2, block 240-*c* may include a set of pages 245 (e.g., page 245-*c*, 245-*f*, 245-*g*, and 245-*h*).

In some examples of the first implementation, the memory system controller 215 may inject dummy data into block 240-*c* at page 245-*g*. Dummy data may refer to random data that differs from the data previously stored to the block which, in some examples, may result in an error at the block 240 (such as an uncorrectable error). As used herein, an uncorrectable error may refer to an error that triggers an uncorrectable error correction code (UECC). In such cases, after an error control operation is performed on data, the error control operation (such as ECC) may indicated that an uncorrectable error exists in the data, which is uncorrectable by that particular error control operation. In some cases, an uncorrectable error may indicate that one or more hardware components of the memory system 210 are failing.

In some instances, page 245-*g* may correspond to a page index associated with the page index of program failure 255 at the block 240-*b* (e.g., index [page 245-*c*] or index [page 245-*c*+1]). As such, the memory system controller 215 may write an uncorrectable error 260 to page 245-*g* of block 240-*c* (e.g., a UECC). In some examples of writing the uncorrectable error 260 to block 240-*e*, the memory system controller 215 may trigger a RAIN operation 270. After moving the data from block 240-*b* to block 240-*c*, the memory system controller 215 may resume performing the write commands 230 at the command queue 225. That is, the memory system controller 215 may determine to perform the write commands 230 prior to performing a RAIN operation 270 on the block 240-*c*. In some examples, the memory system controller 215 may update the block mapping table 275 to disassociate block 240-*b* from superblock 250 and push block 240-*b* to a reclaim queue (e.g., ReClaimQueuc) based on moving the valid data to the block 240-*e*. Further discussion of the reclaim queue is described herein, including with reference to FIG. 6.

In some examples of the first implementation, after pushing the block 240-*b* to the reclaim queue, the memory system controller 215 may pad any empty pages 245 of block 240-*e* with dummy data to close the block 240-*c*. After closing the block 240-*e*, the memory system controller 215 may trigger garbage collection for block 240-*c*. For instance, as part of garbage collection, the memory system controller 215 may perform the RAIN operation 270 to recover the data associated with the program failure. In some examples of performing the RAIN operation 270, the memory system controller 215 may correct the data stored at block 240-*c* and move the corrected data to another unused block 240 (e.g., a third block 240 different from block 240-*b* and block 240-*c*). Because the third block 240 may include the corrected data originally stored at block 240-*b*, the memory system controller 215 may update the block mapping table 275 to associate the third block 240 with the superblock 250. That is, the memory system controller 215 may update the block mapping table 275 to indicate that block 240-*a*, the third block 240, block 240-*c*, and block 240-*d* are included in the superblock 250. In some examples, the third block 240 may be an unused block 240 identified from the plane 235 where the program failure 255 occurred (e.g., the third block 240 may be from plane 235-*b*). Further discussion of the memory system controller 215 performing program failure 255 handling in accordance with a first implementation are described herein, including with reference to FIG. 3.

In examples where program failure 255 occurs during garbage collection, the memory system controller 215 may perform techniques in accordance with a second implementation. For example, as part of a garbage collection operation, the memory system controller 215 may identify block 240-*b* as a destination block 240 to store data previously stored at a source block 240 flagged for garbage collection. Based on identifying the program failure 255 at block 240-*b* (e.g., while moving data from the source block 240 to block 240-*b*), the memory system controller 215 may set a garbage collection abort flag to stop the garbage collection procedure. As such, the memory system controller 215 may identify a second destination block 240 (e.g., block 240-*c*) and move the data from the source block 240 to the block 240-*e* rather than to block 240-*b*. Further discussion of the memory system controller 215 performing program failure 255 handling in accordance with a second implementation are described herein, including with reference to FIG. 4.

In examples where program failure 255 occurs at a system block 240, the memory system controller 215 may perform techniques of program failure 255 handling in accordance with a third implementation. In a first example, blocks 240-*a* through 240-*d* may each be system blocks 240, the write command 230 may be a system page program, and the memory system controller 215 may identify the program failure 255 at the block 240-*b*. In such a first example, the memory system controller 215 may postpone the system page program and wait for a flash program status. As such, during the postponement of the system page program, the memory system controller 215 may move the system data or tables stored at block 240-*b* to the block 240-*c*. For instance, the system data or tables stored to the block 240-*b* may be stored to a temporary storage buffer (TSB) or an SRAM of the memory system 210. As such, the memory system controller 215 may flag the block 240-*b* for the queue associated with bad block 240 handling (e.g., a firmware BadInfo queue) and program the data associated with block 240-*b* (e.g., still stored at the TSB or SRAM) to the block 240-*c*. As such, the memory system controller 215 may update the block mapping table 275 to disassociate block 240-*b* from the superblock 250 and to associate block 240-*e* with superblock 250. Based on associating block 240-*e* with the superblock 250, the memory system controller 215 may update the flash program status to indicate to resume the system page 245 program.

In examples where program failure 255 occurs at a block 240, the memory system controller 215 may perform techniques of program failure 255 handling in accordance with a fourth implementation. In some examples, the fourth implementation may be an alternative implementation to the first implementation, where a claw back procedure may be used instead of the RAIN operation 270. In some examples, a claw back procedure may refer to a recovery mechanism used to reclaim usable space from blocks 240 that have been previously marked as bad. The memory system controller 215 may use the claw back procedure if it is determined that the block 240-*b*, although previously marked as bad, may still be partially or fully utilized (e.g., without compromising data integrity).

In some cases, the memory system controller 215 may utilize the claw back procedure (e.g., rather than the RAIN operation 270) to handle the program failure 255 at the plane 235 level. In accordance with the claw back procedure, the memory system controller 215 may transfer the data stored at the block 240-*b* back to the memory system controller 215 prior to programming a temporary block 240 (e.g., block 240-*c*). In some examples, the memory system controller 215 may refrain from programming the data of block 240-*b* from a page buffer directly to the block 240-*c*. Additionally, data for the next page to be programmed may be stored in different page buffers, and the memory system controller 215 may restore the data from the corresponding page buffers. By operating in accordance with the claw back procedure, the memory system controller 215 may flush (e.g., finish) the write command 230 associated with the program failure 255 prior to handling the program failure 255.

By operating in accordance with techniques of program failure 255 handling described herein, the memory system controller 215 may reduce latency associated with correcting a program failure 255. For example, the memory system controller 215 may refrain from performing RAIN recovery in direct response to a program failure 255. Rather, the memory system controller 215 may move valid data of the block 240 experiencing program failure to an unused block 240 and proceed with the performing write commands 230 at the command queue. As such, the memory system controller 215 may reduce the duration that commands stored to the command queue 225 are postponed from being executed, which may reduce latency associated with programming the write commands 230. Additionally, by writing the uncorrectable error 260 to the unused block 240, the memory system controller 215 may trigger a RAIN operation 270 during background operations of the memory system 210, such that the data affected by the program failure 255 may be recovered after the write commands 230 at the command queue 225 are performed. Such techniques may improve the overall performance of the memory system 210.

Figure 3:
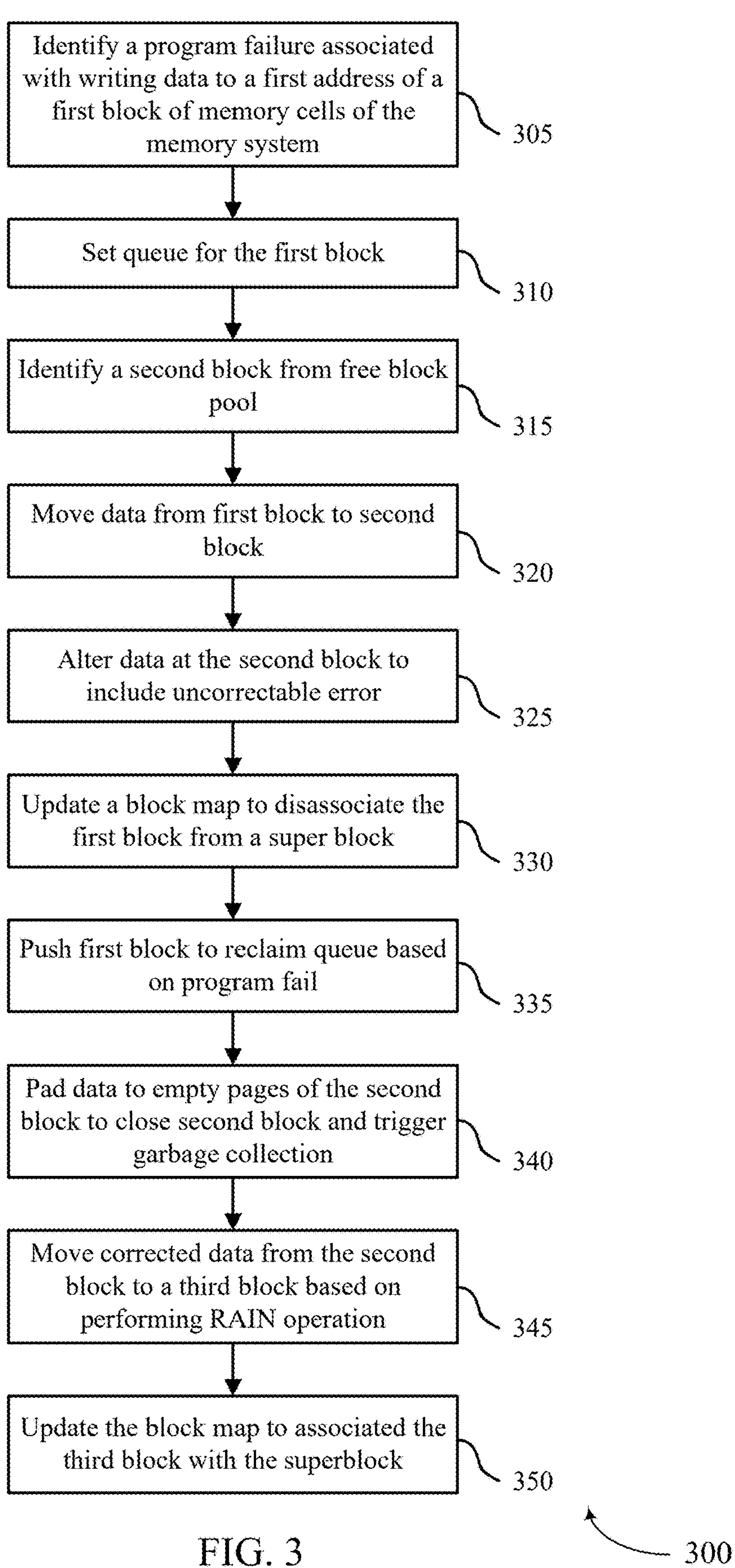
FIGS. 3 through 6 each show an example of a process that supports program failure handling in non-volatile memory systems in accordance with examples as disclosed herein.

FIG. 3 shows an example of a process 300 that supports program failure handling in non-volatile memory systems in accordance with examples as disclosed herein. In some examples, the process 300 may be implemented by one or more aspects of systems 100 and 200. For instance, the process 300 may be implemented by a memory system 110 or 210 described with reference to FIGS. 1 and 2, respectively. In some examples prior to the start of process 300, the memory system may receive a one or more write commands associated with writing data to one or more blocks. Additionally, the memory system may identify a program failure at a page (e.g., during a write operation associated with performing a write command from the queue). As such, process 300 may correspond to one or more operations performed by the memory system to move data from a first block associated with the program failure to a second block, where the memory system may write uncorrectable error to the second block to trigger a RAIN operation at the second block.

Aspects of the process 300 may be implemented by one or more controllers, among other components. Additionally, or alternatively, aspects of the process 300 may be implemented as instructions stored in one or more memories (e.g., firmware stored in one or more memories coupled with memory system 110 or 210). For example, the instructions, if executed by one or more controllers (e.g., the memory system controller 115 or 215), may cause the one or more controllers (or a device or a system) to perform the operations of the process 300.

At 305, the memory system controller may identify a program failure associated with writing data to a first address of a first block of memory cells of a memory system. For instance, the program failure may be an example of a program failure 255, as described with reference to FIG. 2.

At 310, the memory system controller may send an indication to a queue for bad block handling. For example, the memory system controller may store the first address of the first block to a queue (e.g., the BadInfo queue), as described with reference to FIG. 2.

At 315, the memory system controller may identify a second block for storing data moved from the first block. For example, the memory system controller may identify the second block from a free block table (e.g., free block table 265, as described with reference to FIG. 2). That is, the memory system controller may identify the second block from a pool of unused blocks or from an unused superblock.

At 320, the memory system controller may move data from the first block to the second block of memory cells based on identifying the program failure associated with writing the data to the first address of the first block. For example, moving the data from the first block to the second block may include the memory system controller issuing a first command to read the data from the first block of memory cells and issuing a second command to write the data to the second block of memory cells.

Additionally, the first block may be associated with a starting address and an ending address. In a first example, the memory system controller may read the data from a range of addresses beginning at the stating address and ending at the first address (e.g., the address associated with program failure), and may write the data to the second block of memory cells. In a second example, the memory system controller may read the data from a range of addresses beginning at the starting address and ending at a second address immediately after the first address (e.g., the address associated with program failure+1) and may write the data to the second block of memory cells.

At 325, the memory system controller may alter the data stored to the second block. For example, the memory system controller may alter the data stored to the second block to include an uncorrectable error after moving the data from the first block to the second block. In some examples, the uncorrectable error may be an example of uncorrectable error 260 as described with reference to FIG. 2. In some examples, the memory system controller may alter the data by writing dummy data to the second block. In some examples, the memory system controller may alter the data by changing (e.g., flipping) a value of one or more bits of the data stored to the second block. That is, the memory system controller may flip a quantity of bits to cause a low density parity check (LDPC) decoding operation to fail at the second block, where failure of the LDPC decoding operation may trigger the RAIN operation to recover the data that includes the uncorrectable error. In some examples, the memory system controller may alter the data by writing a bit to the page of the second block that flags the page as including an uncorrectable error.

In some examples, the uncorrectable error in the data stored to the second block may be associated with a same page as the program failure associated with the first address of the first block (e.g., page index [program failure] for the first block is equal to page index [UECC] of the second block). In some examples, the uncorrectable error in the data stored to the second block is associated with an index immediately after the page associated with the first address of the first block (e.g., page index [UECC] of the second block is equals to page index [program failure+1] for the first block).

At 330, the memory system controller may update a block map to disassociate the first block from a superblock. For example, the first block of memory cells may be excluded from the superblock based on identifying the program failure at the first address. In some examples, the block map may be an example of block mapping table 275, as described with reference to FIG. 2. In some examples, the memory system controller may retire the first block based on moving the data from the first block to the second block.

At 335, the memory system controller may push the first block to a queue (e.g., a reclaim queue) based on identifying the program failure at the first address. Further discussion of the reclaim queue is described herein, including with reference to FIG. 6.

At 340, the memory system controller may pad data to empty pages of the second block. For example, after moving the data to from the first block to the second block, and after altering the data at the second block to include the uncorrectable error, the memory system controller may fill any remaining empty pages of the second block with dummy data, such that each page of the second block is full (e.g., filled with data). As such, the memory system controller may close the second block and trigger garbage collection to correct the data in the second block.

At 345, the memory system controller may move the corrected data from the second block to a third block in accordance with a RAIN operation. For example, the memory system controller may perform the RAIN operation on the altered data stored to the second block. For example, any read based operation may trigger the RAIN operation based on the uncorrectable error at the second block. Such read operations may include maintenance operations (e.g., garbage collection), host system read operations (e.g., a host system sends a read command to the memory system controller associated with the LBA of the second block that includes the uncorrectable error), or a maintenance relocation operation of the data stored at the second block.

In some examples, the RAIN operation may be an example of RAIN operation 270, as described with reference to FIG. 2. For example, performing the RAIN operation may include correcting the uncorrectable error in the data stored to the second block and moving the data from the second block to the third block of memory cells. In some examples, the RAIN operation may be performed as part of a maintenance operation performed at the memory system. In some examples, the memory system controller may identify the third block for storing the data from a pool of unused blocks or from an unused superblock in accordance with performing the RAIN operation on the data. In some examples, the third block may be from a same plane as the first block.

At 350, the memory system controller may update a mapping between a logical address associated with the data and a physical address of the third block of memory cells based on moving the data from the second block to the third block (e.g., the memory system controller may update the LBAs associated with the data to correspond to the PBAs of the pages of the third block). For example, the first block may be included in a superblock prior to updating the mapping between the logical address associated with the data and the physical address of the third block of memory cells. Additionally, the third block of memory cells may be included in the superblock based on updating the mapping between the logical address associated with the data and the physical address of the third block of memory cells. In some examples, updating the mapping may include updating the block mapping table 275, as described with reference to FIG. 3.

By operating in accordance with techniques of process 300 described herein, the memory system controller may reduce latency associated with correcting a program failure. For example, the memory system controller may refrain from performing RAIN recovery in direct response to a program failure. Rather, the memory system controller may move the valid data of the first block to the second block and proceed with the performing write commands at the command queue. As such, the memory system controller may reduce the duration that commands stored to the command queue are postponed, which may reduce the latency associated with programming the write commands. Additionally, by writing uncorrectable error to the second block, the memory system controller may trigger a RAIN operation during background operations of the memory system, such that the data affected by the program failure may be recovered after the write commands at the command queue are performed. Such techniques may improve the overall performance of the memory system.

Figure 4:
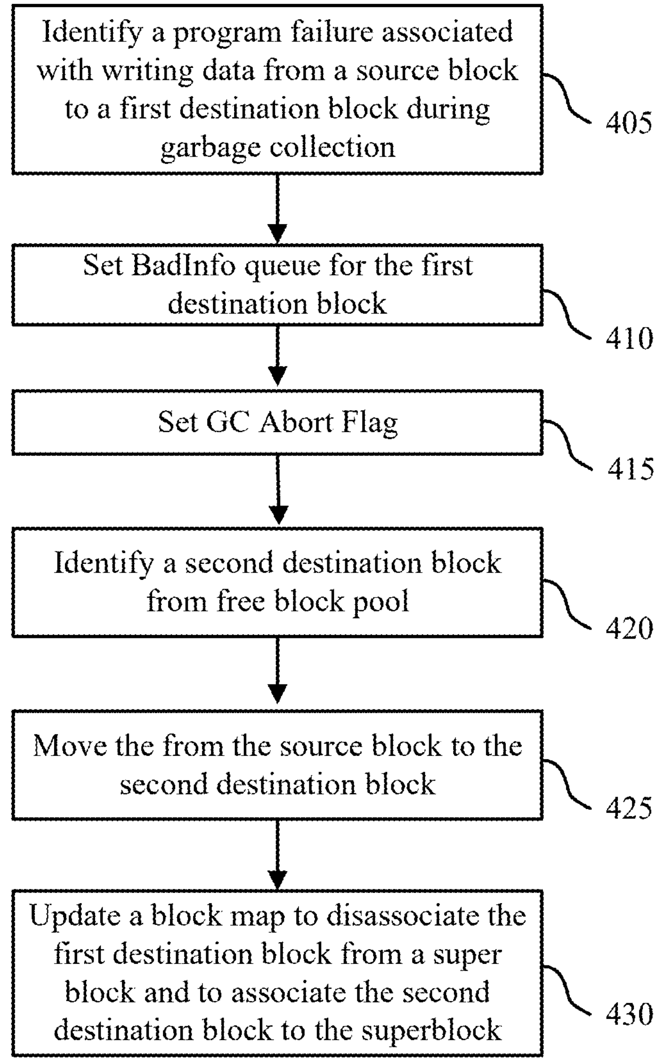

FIG. 4 shows an example of a process 400 that supports program failure handling in non-volatile memory systems in accordance with examples as disclosed herein. In some examples, the process 400 may be implemented by one or more aspects of systems 100 and 200. For instance, the process 400 may be implemented by a memory system 110 or 210 described with reference to FIGS. 1 and 2, respectively. In some examples prior to the start of process 400, the memory system may perform a garbage collection procedure to write data from a source block to a first destination block. As such, process 400 may correspond to one or more operations performed by the memory system to identify a program failure while moving data to the first destination block, and to identify a second destination block to for garbage collection instead of the first destination block.

Aspects of the process 400 may be implemented by one or more controllers, among other components. Additionally, or alternatively, aspects of the process 400 may be implemented as instructions stored in one or more memories (e.g., firmware stored in one or more memories coupled with memory system 110 or 210). For example, the instructions, if executed by one or more controllers (e.g., the memory system controller 115 or 215), may cause the one or more controllers (or a device or a system) to perform the operations of the process 400.

At 405, the memory system controller may identify, as part of moving data from a source block to a first destination block of the memory system, a program failure associated the first destination block. In some examples, the memory system controller may identify the program failure associated with the first destination block during a maintenance operation performed at the memory system. For example, moving the data from the source block to the first destination block of the memory system may include reading the data from the source block and writing the data to the first destination block, where the program failure is identified based on writing a portion of the data to the first destination block.

At 410, the memory system controller may send an indication to a queue for bad block handling. For example, the memory system controller may store an indicator associated with the first destination block at the BadInfo queue, as described with reference to FIG. 2. As such, the memory system controller may retire the first destination block based on identifying the program failure associated with the first destination block.

At 415, the memory system controller may set a garbage collection abort flag. For instance, setting the garbage collection abort flag may include writing a first value to a register of the memory system based on identifying the program failure at the first destination block. In some examples, the garbage collection abort flag may be used to control the garbage collection procedure process, which may allow the memory system controller to pause or stop garbage collection under certain conditions to maintain system stability and performance. Additionally, the memory system controller may refrain from moving the data from the source block to the first destination block based on identifying the program failure associated with the first destination block or based on identifying the garbage collection abort flag.

At 420, the memory system controller may identify a second destination block based on writing the first value to the register of the memory system (e.g., the garbage collection abort flag). In some examples, the memory system controller may identify the second destination block from a free block table (e.g., free block table 265, as described with reference to FIG. 2). That is, the memory system controller may identify the second destination block from a pool of unused blocks or from an unused superblock. In some examples, the second destination block may be identified based on being included in a same plane as the first destination block.

At 425, the memory system controller may move the data from the source block to the second destination block based on identifying the second destination block. For example, the source block may maintain a valid copy of the data after identifying the program failure associated with the first destination block. As such, the memory system controller may move the data from the source block to the second destination block (e.g., rather than performing a RAIN operation, since the source block still maintains a valid copy of the data).

At 430, the memory system controller may update a mapping between a logical address associated with the data and a physical address of the second destination block of based on moving the data from the source block to the second destination block. For example, the memory system controller may update a block mapping table to disassociate the first destination block from a superblock (e.g., a garbage collection superblock) and associate the second destination block with the superblock. In some examples, such a block mapping table may be an example of block mapping table 275 as described with reference to FIG. 2.

By operating in accordance with process 400, the memory system controller may reduce latency associated with a program failure during maintenance operations. For example, the memory system may use the garbage collection abort flag to stop operations of the garbage collection associated with writing data to the first destination block experiencing program failure. Additionally, the memory system controller may identify a second destination block to move the data stored at the first destination block (e.g., rather than performing a maintenance operation on the first destination block). As such, the memory system controller may reduce latency by using the second destination block over the first destination block. Such techniques may improve the overall performance of the memory system.

Figure 5:
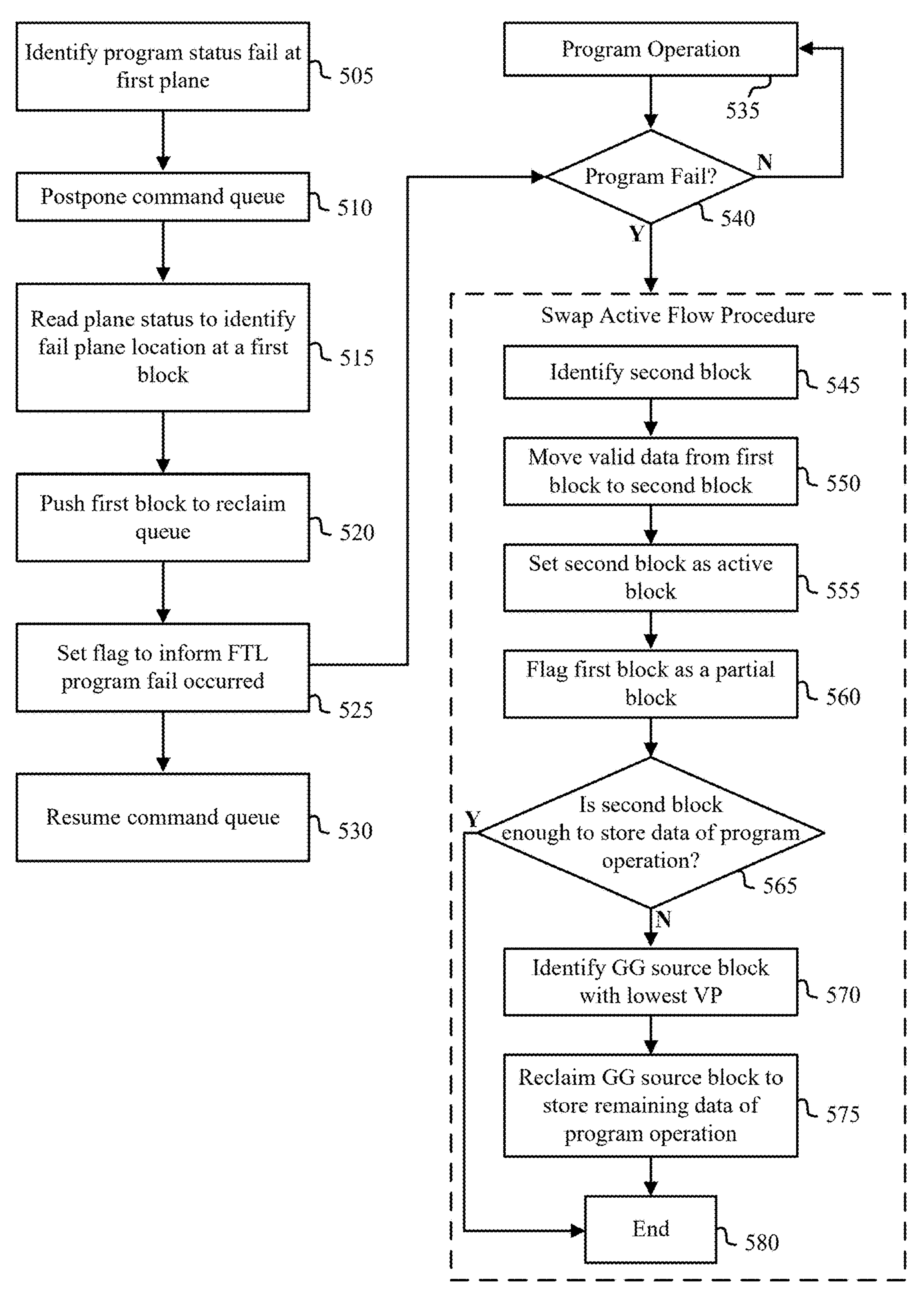

FIG. 5 shows an example of a process 500 that supports program failure handling in non-volatile memory systems in accordance with examples as disclosed herein. In some examples, the process 500 may be implemented by one or more aspects of systems 100 and 200. For instance, the process 500 may be implemented by a memory system 110 or 210 described with reference to FIGS. 1 and 2, respectively. In some examples, process 500 may illustrate various techniques performed by one or more portions of the memory system such as a backend thread and a flash translation layer (FTL). For instance, the backend thread may refer to the background processes that handle various maintenance tasks of the memory system. These tasks may increase performance, reliability, and longevity of the memory device. In some examples, the backend thread may operate independently of the primary data read and write operations, which may allow the memory system to perform maintenance operations concurrent to access operations. Additionally, the FTL may provide a level of abstraction that allows the operating system of the memory system and applications to interact with flash storage. By handling wear leveling, garbage collection, and other maintenance tasks, the FTL may allow for flash-based storage systems to increase memory system reliability, performance, and data storage longevity. In some examples, the backend thread and FTL may be respective portions or components of one or more controllers (e.g., the memory system controller 115 or 215).

At 505, a program fail may be identified. For example, the backend thread may identify a program status fail, such that a portion of the memory device failed to store one or more bits of data (e.g., correctly) during a write operation associated with performing a write command.

At 510, the command queue may be postponed. For examples, the backend thread may stop (e.g., force stop, postpone) the command queue based on identifying the program status fail at the memory device. In some examples, the command queue may be an example of the command queue 225, as described with reference to FIG. 2.

At 515, a plan status may be read. For example, the backend thread may perform (e.g., execute) a read plane status command to identify the location of the plane associated with the program status fail. That is, the backend thread may identify a first block a first plane that is associated with a program fail based on performing the read plane status command.

At 520, the first block may be pushed to a reclaim queue. For example, based on identifying the program failure at the first block of the first plane, the backend thread may push an identifier associated with the first block the reclaim queue. For example, a reclaim queue may be a mechanism used to manage the process of reclaiming memory blocks that have been marked as invalid or stale. Further discussion of the operations at the reclaim queue are described herein, including with reference to FIG. 6.

At 525, a flag may be set. For example, the backend thread may set a flag to inform the FTL that a program fail has occurred. In some examples, the flag may be an example of setting a bit at a register (e.g., mode register) of the memory device, where setting the bit indicates to the FTL that a program fail has occurred. In some examples, the set flag may further indicate the location of the program fail (e.g., a physical address of the page of the first block where the program fail occurred).

At 530, the command queue may be resumed. For example, the backend thread may resume the command queue based on setting the flag to inform the FTL of the program fail. As such the FTL may perform one or more operations to identify and resolve the program fail concurrent to the command queue being resumed.

At 535, one or more program operations may be performed. For example, the FTL may perform one or more program operations to store data at the memory device. That is the FTL may execute one or more write commands at the command queue.

At 540, a program failure determination may be is made. For example, the FTL may determine whether a flag has been set that indicates program failure. If no flag has been set, then the FTL may proceed with performing additional program operations in accordance with the write commands at the command queue. If, however, the FTL identifies that the flag indicating program failure has been set (e.g., by backend thread, at 525), then the FTL may proceed with performing a swap active flow procedure.

At 545, a second block may be identified. For example, based on identifying that a program failure has occurred in accordance with the set flag, the FTL may identify a second block to use instead of the first block (e.g., block 240-*e* identified from the free block table 265, as described with reference to FIG. 2).

At 550, data may be moved to the second block. For example, the FTL may move valid data of the first block (e.g., data stored to the first block prior to program failure) to the second block.

At 555, the second block may be set as an active block. For example, the FTL may set the second block as an active block. In some examples, set the second block as an active block includes updating a block map (e.g., block mapping table 275) that disassociates the first block from a superblock and associates the second block with the superblock.

At 560, the first block may be flagged as a partial block. For example, based on the program failure at the first block, the FTL may identify that the one or more memory cells associated with the program failure may no longer be used for storing data (e.g., due to physical defects of the one or more memory cells).

At 565, a determination regarding data at the second block may be made. For example, the FTL may determine whether a size associated with the second block is large enough to store data associated with the current program operation. If the second block is large enough to store the data of the current program operation, the FTL may end the swap active flow procedure (e.g., proceed to 580).

At 570, if the second block is not large enough to store the data of the current program operation, a third block may be identified. For example, the FTL may identify a garbage collection source block (e.g., with a lowest valid page count) as the third block.

At 575, the garbage collection source block may be reclaimed. For example, the FTL may reclaim the garbage collection source block to store the remaining data of the program operation.

At 580, the swap active flow procedure may end. For example, based on finishing the program operation (e.g., initially associated with a program failure at the first block) the FTL may conclude the swap active flow procedure. That is, the swap active flow procedure is completed after resolving the program failure and moving the data to a second block and finishing the program operation at the second block (e.g., and additional blocks if the program operation is stores data greater than the size of the second block).

In some examples, after the program failure is resolved, the FTL may remove the set flag indicating the program failure. After completing the swap active flow procedure, the FTL may proceed to executing additional program operations at 535.

Figure 6:
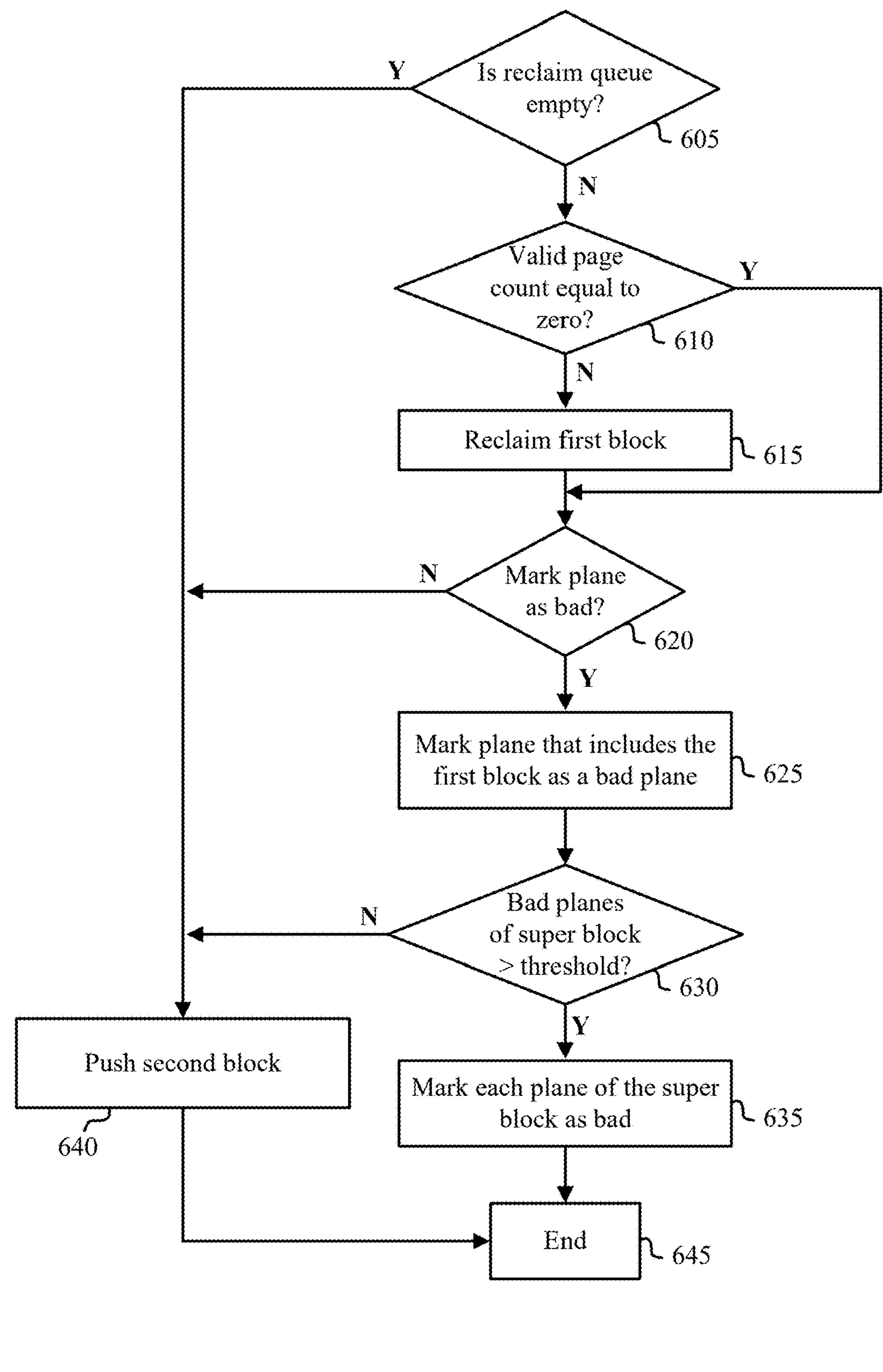

FIG. 6 shows an example of a process 600 that supports program failure handling in non-volatile memory systems in accordance with examples as disclosed herein. In some examples, the process 600 may be implemented by one or more aspects of system 100, system 200, process 300, process 600, and process 500. For instance, the process 600 may be implemented by a memory system 110 or 210 described with reference to FIGS. 1 and 2, respectively. Additionally, process 600 may describe one or more options performed at the reclaim queue of the memory system.

Aspects of the process 600 may be implemented by one or more controllers, among other components. Additionally, or alternatively, aspects of the process 600 may be implemented as instructions stored in one or more memories (e.g., firmware stored in one or more memories coupled with memory system 110 or 210). For example, the instructions, if executed by one or more controllers (e.g., the memory system controller 115 or 215), may cause the one or more controllers (or a device or a system) to perform the operations of the process 600.

At 605, memory system controller may determine whether a queue (e.g., the reclaim queue) is empty. If the reclaim queue is empty, the memory system controller may proceed to operations of 640.

At 610, if the reclaim queue is not empty, then a valid page count for a block at the reclaim queue may be determined. For example, in accordance with process 500, the backend thread may push the first block to the reclaim queue based on identifying the program failure. In such an example, the memory system controller may determine whether the valid page count of the first block is equal to zero.

At 615, if the valid page count does not equal zero, then the memory system controller may perform a block reclaim procedure to reclaim the first block. For example, reclaiming the first block may involve the process of garbage collection, where the memory system controller identifies and processes the first block containing invalid data to free up space for future writes. In some examples, the invalid data at the memory system may be caused by the program failure. If the valid page count does equal zero, then the memory system controller may skip operations at 615 and proceed to operations at 620.

At 620, the memory system controller may determine whether to mark a first plane that includes the first block as a bad plane. Planes, similar to blocks and pages, may be marked as bad for various reasons. For example, a plane marked as bad may indicate that the plane has developed defects or errors that make the plane unreliable for storing data. In one example, the memory system controller may mark the first plane as bad based on a quantity of memory cells, pages, or blocks of the plane that are deemed as unreliable for storing data. For example, if the quantity is above a configured threshold, the memory system controller may determine that to mark the first plane as bad. If the memory system controller does not mark the first plane as a bad plane, the memory system controller may proceed to operations at 640.

At 625, if the memory system controller determines that the first plane satisfies one or more characteristics of a bad plane, the memory system controller may mark the first plane as a bad plane.

At 630, the threshold quantity of bad planes for a superblock may be determined. For example, the first plane may be one of a quantity of planes associated with a superblock (e.g., a superblock 250) of the memory device. As such, the memory system controller may determine a quantity of planes marked as bad for the superblock associated with first plane. In some examples, the quantity of bad planes may be indicative of a percentage of total quantity of planes of the superblock. In some examples, the percentage of bad planes may be compared to a threshold (e.g., a percentage threshold). If the percentage of bad planes does not satisfy (e.g., is less than or equal to) the threshold, the memory system controller may proceed to the operations at 640.

At 635, if the percentage of bad planes does satisfy (e.g., is greater than) the threshold, the memory system controller may mark each plane of the superblock associated with the first plane as bad planes.

At 640, the memory system controller may push a second block. For example, pushing a second block may include indicating to use the second block instead of the first block. For instance, the second block of process 600 may be the same second block described with reference to process 500, such that the second block is flagged to store the valid data from the defective first block. In some examples, the second block may also be a part of the first plane. That is the second block may be pushed based on being from the same first plane as the first block that is associated with the program failure.

At 645, the memory system controller may end operations of process 600. That is, operations at the reclaim queue may be concluded.

Figure 7:
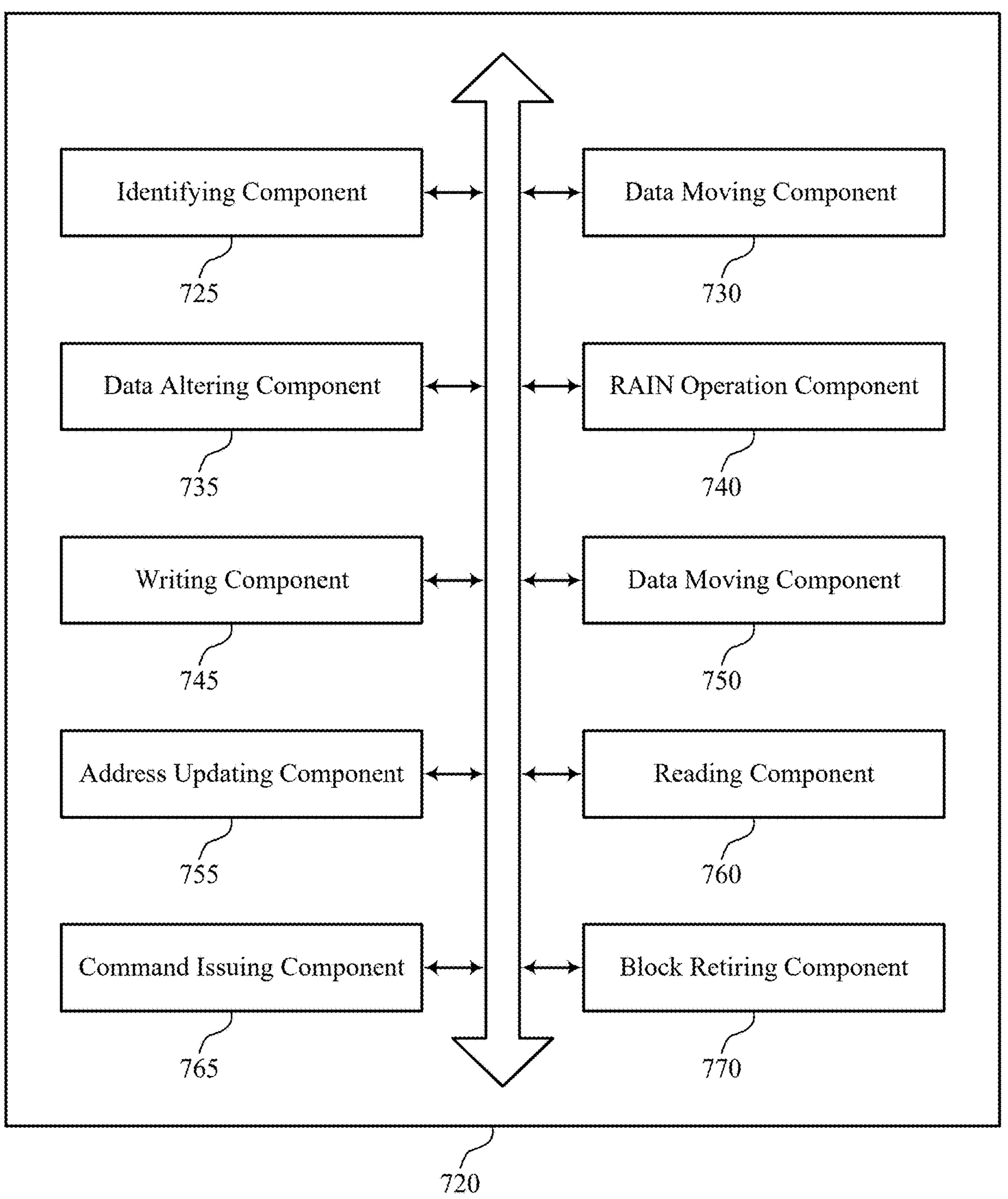
FIG. 7] shows a block diagram of a memory system that supports program failure handling in non-volatile memory systems in accordance with examples as disclosed herein.

FIG. 7 shows a block diagram 700 of a memory system 720 that supports program failure handling in non-volatile memory systems in accordance with examples as disclosed herein. The memory system 720 may be an example of aspects of a memory system as described with reference to FIGS. 1 through 6. The memory system 720, or various components thereof, may be an example of means for performing various aspects of program failure handling in non-volatile memory systems as described herein. For example, the memory system 720 may include an identifying component 725, a data moving component 730, a data altering component 735, a RAIN operation component 740, a writing component 745, a data moving component 750, an address updating component 755, a reading component 760, a command issuing component 765, a block retiring component 770, or any combination thereof. Each of these components, or components of subcomponents thereof (e.g., one or more processors, one or more memories), may communicate, directly or indirectly, with one another (e.g., via one or more buses).

The identifying component 725 may be configured as or otherwise support a means for identifying a program failure associated with writing data to a first address of a first block of memory cells of the memory system. The data moving component 730 may be configured as or otherwise support a means for moving data from the first block to a second block of memory cells based at least in part on identifying the program failure associated with writing the data to the first address of the first block. The data altering component 735 may be configured as or otherwise support a means for altering the data stored to the second block to include an uncorrectable error after moving the data from the first block to the second block. The RAIN operation component 740 may be configured as or otherwise support a means for performing a redundant array of independent NAND (RAIN) operation on the altered data stored to the second block based at least in part on altering the data, the RAIN operation including correcting the uncorrectable error in the data stored to the second block and moving the data from the second block to a third block of memory cells.

In some examples, to support altering the data stored to the second block, the writing component 745 may be configured as or otherwise support a means for writing dummy data to the second block.

In some examples, the address updating component 755 may be configured as or otherwise support a means for updating a mapping between a logical address associated with the data and a physical address of the third block of memory cells based at least in part on moving the data from the second block to the third block.

In some examples, the first block is included in a superblock prior to updating the mapping between the logical address associated with the data and the physical address of the third block of memory cells. In some examples, the third block of memory cells is included in the superblock based at least in part on updating the mapping between the logical address associated with the data and the physical address of the third block of memory cells.

In some examples, the first block of memory cells is excluded from the superblock based at least in part on updating the mapping between the logical address associated with the data and the physical address of the third block of memory cells.

In some examples, the first block is associated with a starting address and, to support an ending address, where moving the data from the first block to the second block, the reading component 760 may be configured as or otherwise support a means for reading the data from a range of addresses beginning at the starting address and ending at the first address. In some examples, the first block is associated with a starting address and, to support an ending address, where moving the data from the first block to the second block, the writing component 745 may be configured as or otherwise support a means for writing the data read from the starting address through the first address to the second block of memory cells.

In some examples, the first block is associated with a starting address and, to support an ending address, where moving the data from the first block to the second block, the reading component 760 may be configured as or otherwise support a means for reading the data from a range of addresses beginning at the starting address and ending at a second address immediately after the first address. In some examples, the first block is associated with a starting address and, to support an ending address, where moving the data from the first block to the second block, the writing component 745 may be configured as or otherwise support a means for writing the data read from the starting address through the second address to the second block of memory cells.

In some examples, to support moving the data from the first block to the second block, the command issuing component 765 may be configured as or otherwise support a means for issuing a first command to read the data from the first block of memory cells. In some examples, to support moving the data from the first block to the second block, the command issuing component 765 may be configured as or otherwise support a means for issuing a second command to write the data to the second block of memory cells.

In some examples, to support altering the data stored to the second block, the data altering component 735 may be configured as or otherwise support a means for changing a value of one or more bits of the data stored to the second block.

In some examples, the RAIN operation is performed as part of a maintenance operation performed at the memory system.

In some examples, the block retiring component 770 may be configured as or otherwise support a means for retiring the first block based at least in part on moving the data from the first block to the second block.

In some examples, the identifying component 725 may be configured as or otherwise support a means for identifying the third block for storing the data from a pool of unused blocks or from an unused superblock in accordance with performing the RAIN operation on the data.

In some examples, the uncorrectable error in the data stored to the second block is associated with a same page as the program failure associated with the first address of the first block.

In some examples, the identifying component 725 may be configured as or otherwise support a means for identifying, as part of moving data from a source block to a first destination block of the memory system, a program failure associated the first destination block. The writing component 745 may be configured as or otherwise support a means for writing a first value to a register of the memory system based at least in part on identifying the program failure at the first destination block. In some examples, the identifying component 725 may be configured as or otherwise support a means for identifying a second destination block for moving the data to based at least in part on writing the first value to the register of the memory system. The data moving component 750 may be configured as or otherwise support a means for moving the data from the source block to the second destination block based at least in part on identifying the second destination block. The address updating component 755 may be configured as or otherwise support a means for updating a mapping between a logical address associated with the data and a physical address of the second destination block of based at least in part on moving the data from the source block to the second destination block.

In some examples, the data moving component 750 may be configured as or otherwise support a means for refraining from continuing to move the data from the source block to the first destination block based at least in part on identifying the program failure associated with the first destination block.

In some examples, the block retiring component 770 may be configured as or otherwise support a means for retiring the first destination block based at least in part on identifying the program failure associated with the first destination block.

In some examples, the source block maintains a valid copy of the data after identifying the program failure associated with the first destination block.

In some examples, the program failure associated with the first destination block is identified during a maintenance operation performed at the memory system.

In some examples, to support moving the data from the source block to the first destination block of the memory system, the reading component 760 may be configured as or otherwise support a means for reading the data from the source block. In some examples, to support moving the data from the source block to the first destination block of the memory system, the writing component 745 may be configured as or otherwise support a means for writing the data to the first destination block, where the program failure is identified based at least in part on writing a portion of the data to the first destination block.

In some examples, the described functionality of the memory system 720, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 720, or various components thereof, may be implemented at least in part by instructions (e.g., stored in memory, non-transitory computer-readable medium) executable by such at least one processor.

Figure 8:
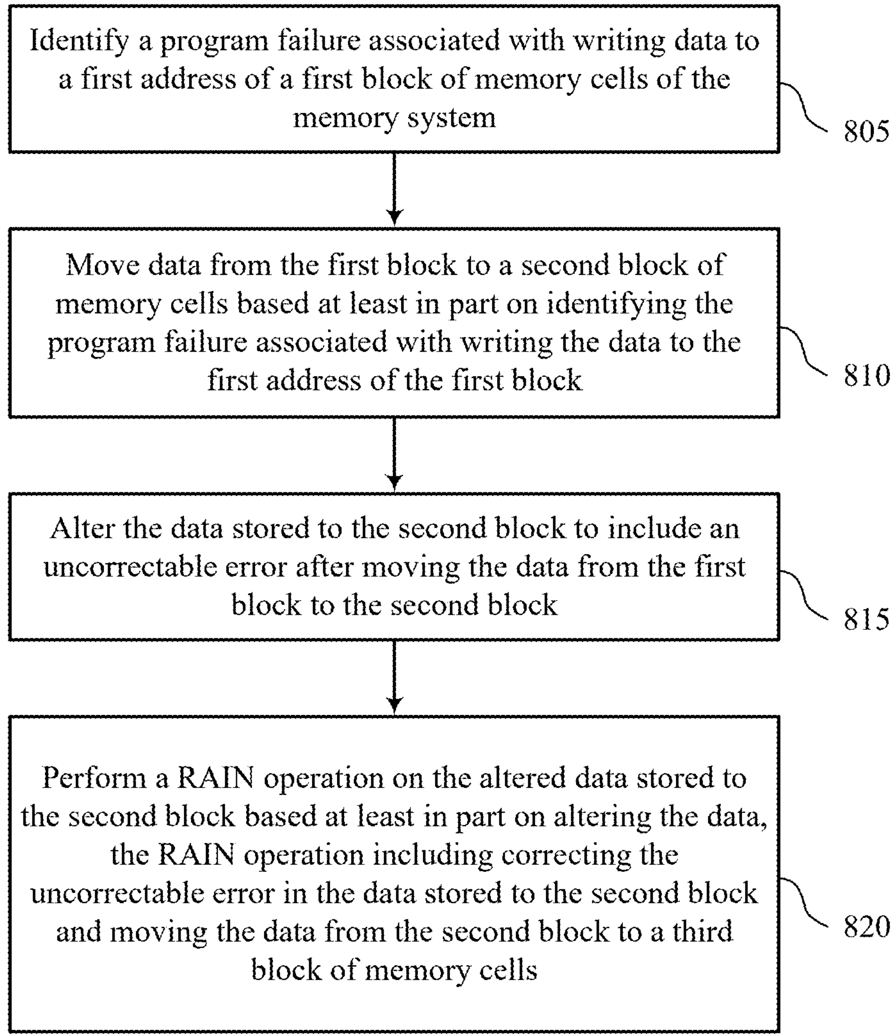
FIGS. 8 and 9 show flowcharts illustrating a method or methods that support program failure handling in non-volatile memory systems in accordance with examples as disclosed herein.

FIG. 8 shows a flowchart illustrating a method 800 that supports program failure handling in non-volatile memory systems in accordance with examples as disclosed herein. The operations of method 800 may be implemented by a memory system or its components as described herein. For example, the operations of method 800 may be performed by a memory system as described with reference to FIGS. 1 through 7. In some examples, a memory system may execute a set of instructions to control the functional elements of the device to perform the described functions. Additionally, or alternatively, the memory system may perform aspects of the described functions using special-purpose hardware.

At 805, the method may include identifying a program failure associated with writing data to a first address of a first block of memory cells of the memory system. In some examples, aspects of the operations of 805 may be performed by an identifying component 725 as described with reference to FIG. 7.

At 810, the method may include moving data from the first block to a second block of memory cells based at least in part on identifying the program failure associated with writing the data to the first address of the first block. In some examples, aspects of the operations of 810 may be performed by a data moving component 730 as described with reference to FIG. 7.

At 815, the method may include altering the data stored to the second block to include an uncorrectable error after moving the data from the first block to the second block. In some examples, aspects of the operations of 815 may be performed by a data altering component 735 as described with reference to FIG. 7.

At 820, the method may include performing a redundant array of independent NAND (RAIN) operation on the altered data stored to the second block based at least in part on altering the data, the RAIN operation including correcting the uncorrectable error in the data stored to the second block and moving the data from the second block to a third block of memory cells. In some examples, aspects of the operations of 820 may be performed by a RAIN operation component 740 as described with reference to FIG. 7.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for identifying a program failure associated with writing data to a first address of a first block of memory cells of the memory system; moving data from the first block to a second block of memory cells based at least in part on identifying the program failure associated with writing the data to the first address of the first block; altering the data stored to the second block to include an uncorrectable error after moving the data from the first block to the second block; and performing a redundant array of independent NAND (RAIN) operation on the altered data stored to the second block based at least in part on altering the data, the RAIN operation including correcting the uncorrectable error in the data stored to the second block and moving the data from the second block to a third block of memory cells.

Aspect 2: The method, apparatus, or non-transitory computer-readable medium of aspect 1, where altering the data stored to the second block includes operations, features, circuitry, logic, means, or instructions, or any combination thereof for writing dummy data to the second block.

Aspect 3: The method, apparatus, or non-transitory computer-readable medium of any of aspects 1 through 2, further including operations, features, circuitry, logic, means, or instructions, or any combination thereof for updating a mapping between a logical address associated with the data and a physical address of the third block of memory cells based at least in part on moving the data from the second block to the third block.

Aspect 4: The method, apparatus, or non-transitory computer-readable medium of aspect 3, where the first block is included in a superblock prior to updating the mapping between the logical address associated with the data and the physical address of the third block of memory cells and the third block of memory cells is included in the superblock based at least in part on updating the mapping between the logical address associated with the data and the physical address of the third block of memory cells.

Aspect 5: The method, apparatus, or non-transitory computer-readable medium of aspect 4, where the first block of memory cells is excluded from the superblock based at least in part on updating the mapping between the logical address associated with the data and the physical address of the third block of memory cells.

Aspect 6: The method, apparatus, or non-transitory computer-readable medium of any of aspects 1 through 5, where the first block is associated with a starting address, and an ending address, where moving the data from the first block to the second block includes operations, features, circuitry, logic, means, or instructions, or any combination thereof for reading the data from a range of addresses beginning at the starting address and ending at the first address and writing the data read from the starting address through the first address to the second block of memory cells.

Aspect 7: The method, apparatus, or non-transitory computer-readable medium of any of aspects 1 through 6, where the first block is associated with a starting address, and an ending address, where moving the data from the first block to the second block includes operations, features, circuitry, logic, means, or instructions, or any combination thereof for reading the data from a range of addresses beginning at the starting address and ending at a second address immediately after the first address and writing the data read from the starting address through the second address to the second block of memory cells.

Aspect 8: The method, apparatus, or non-transitory computer-readable medium of any of aspects 1 through 7, where moving the data from the first block to the second block includes operations, features, circuitry, logic, means, or instructions, or any combination thereof for issuing a first command to read the data from the first block of memory cells and issuing a second command to write the data to the second block of memory cells.

Aspect 9: The method, apparatus, or non-transitory computer-readable medium of any of aspects 1 through 8, where altering the data stored to the second block includes operations, features, circuitry, logic, means, or instructions, or any combination thereof for changing a value of one or more bits of the data stored to the second block.

Aspect 10: The method, apparatus, or non-transitory computer-readable medium of any of aspects 1 through 9, where the RAIN operation is performed as part of a maintenance operation performed at the memory system.

Aspect 11: The method, apparatus, or non-transitory computer-readable medium of any of aspects 1 through 10, further including operations, features, circuitry, logic, means, or instructions, or any combination thereof for retiring the first block based at least in part on moving the data from the first block to the second block.

Aspect 12: The method, apparatus, or non-transitory computer-readable medium of any of aspects 1 through 11, further including operations, features, circuitry, logic, means, or instructions, or any combination thereof for identifying the third block for storing the data from a pool of unused blocks or from an unused superblock in accordance with performing the RAIN operation on the data.

Aspect 13: The method, apparatus, or non-transitory computer-readable medium of any of aspects 1 through 12, where the uncorrectable error in the data stored to the second block is associated with a same page as the program failure associated with the first address of the first block.

Figure 9:
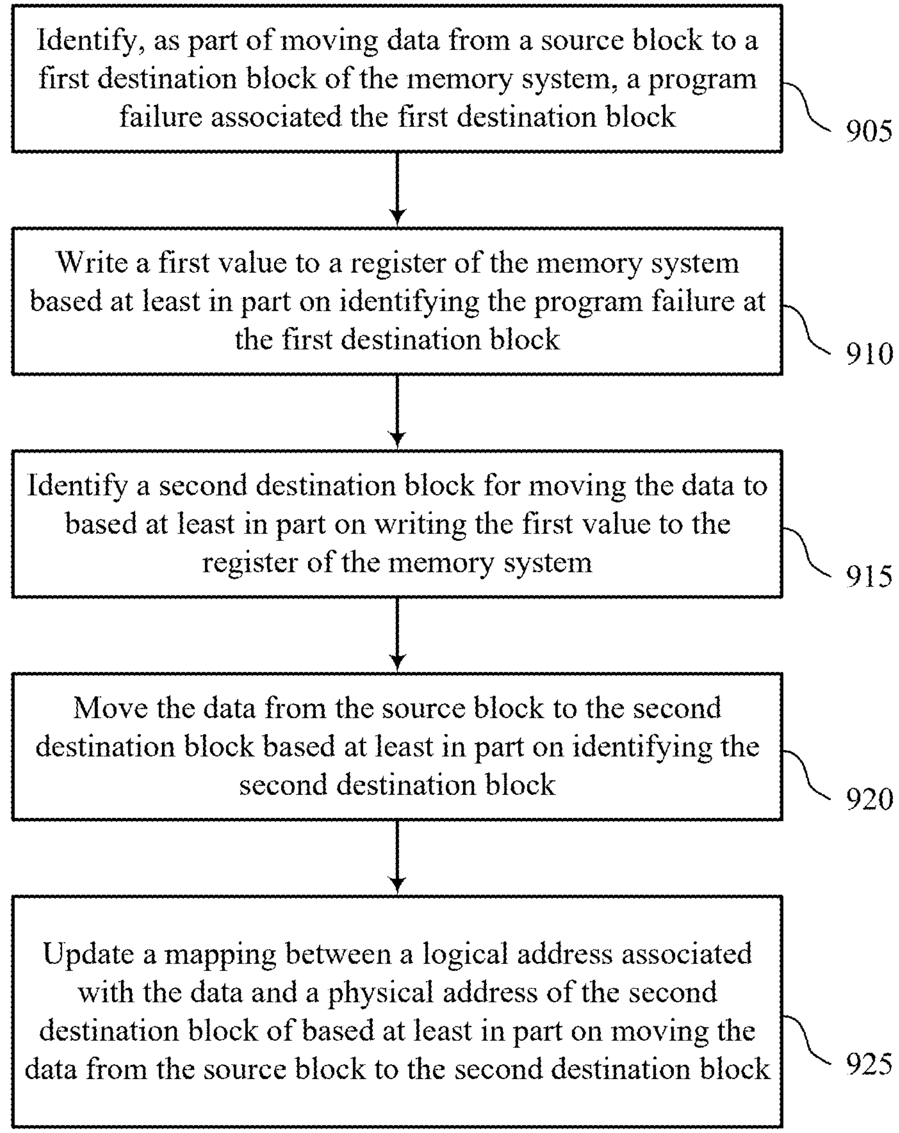

FIG. 9 shows a flowchart illustrating a method 900 that supports program failure handling in non-volatile memory systems in accordance with examples as disclosed herein. The operations of method 900 may be implemented by a memory system or its components as described herein. For example, the operations of method 900 may be performed by a memory system as described with reference to FIGS. 1 through 7. In some examples, a memory system may execute a set of instructions to control the functional elements of the device to perform the described functions. Additionally, or alternatively, the memory system may perform aspects of the described functions using special-purpose hardware.

At 905, the method may include identifying, as part of moving data from a source block to a first destination block of the memory system, a program failure associated the first destination block. In some examples, aspects of the operations of 905 may be performed by an identifying component 725 as described with reference to FIG. 7.

At 910, the method may include writing a first value to a register of the memory system based at least in part on identifying the program failure at the first destination block. In some examples, aspects of the operations of 910 may be performed by a writing component 745 as described with reference to FIG. 7.

At 915, the method may include identifying a second destination block for moving the data to based at least in part on writing the first value to the register of the memory system. In some examples, aspects of the operations of 915 may be performed by an identifying component 725 as described with reference to FIG. 7.

At 920, the method may include moving the data from the source block to the second destination block based at least in part on identifying the second destination block. In some examples, aspects of the operations of 920 may be performed by a data moving component 750 as described with reference to FIG. 7.

At 925, the method may include updating a mapping between a logical address associated with the data and a physical address of the second destination block of based at least in part on moving the data from the source block to the second destination block. In some examples, aspects of the operations of 925 may be performed by an address updating component 755 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 14: A method, apparatus, or non-transitory computer-readable medium including operations, features, circuitry, logic, means, or instructions, or any combination thereof for identifying, as part of moving data from a source block to a first destination block of the memory system, a program failure associated the first destination block; writing a first value to a register of the memory system based at least in part on identifying the program failure at the first destination block; identifying a second destination block for moving the data to based at least in part on writing the first value to the register of the memory system; moving the data from the source block to the second destination block based at least in part on identifying the second destination block; and updating a mapping between a logical address associated with the data and a physical address of the second destination block of based at least in part on moving the data from the source block to the second destination block.

Aspect 15: The method, apparatus, or non-transitory computer-readable medium of aspect 14, further including operations, features, circuitry, logic, means, or instructions, or any combination thereof for refraining from continuing to move the data from the source block to the first destination block based at least in part on identifying the program failure associated with the first destination block.

Aspect 16: The method, apparatus, or non-transitory computer-readable medium of any of aspects 14 through 15, further including operations, features, circuitry, logic, means, or instructions, or any combination thereof for retiring the first destination block based at least in part on identifying the program failure associated with the first destination block.

Aspect 17: The method, apparatus, or non-transitory computer-readable medium of any of aspects 14 through 16, where the source block maintains a valid copy of the data after identifying the program failure associated with the first destination block.

Aspect 18: The method, apparatus, or non-transitory computer-readable medium of any of aspects 14 through 17, where the program failure associated with the first destination block is identified during a maintenance operation performed at the memory system.

Aspect 19: The method, apparatus, or non-transitory computer-readable medium of any of aspects 14 through 18, where moving the data from the source block to the first destination block of the memory system includes operations, features, circuitry, logic, means, or instructions, or any combination thereof for reading the data from the source block and writing the data to the first destination block, where the program failure is identified based at least in part on writing a portion of the data to the first destination block.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and a second condition or action may occur directly as a result of the previous condition or action occurring independent of whether other conditions or actions occur. In some examples, a first condition or action may be performed, and a second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry, processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, which can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or one or more processors.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:

one or more memory devices; and processing circuitry coupled with the one or more memory devices and configured to cause the memory system to:

identify a program failure associated with writing data to a first address of a first block of memory cells of the memory system;

move data from the first block to a second block of memory cells based at least in part on identifying the program failure associated with writing the data to the first address of the first block;

alter the data stored to the second block to include an uncorrectable error after moving the data from the first block to the second block; and perform a redundant array of independent NAND (RAIN) operation on the altered data stored to the second block based at least in part on altering the data, the RAIN operation comprising correcting the uncorrectable error in the data stored to the second block and moving the data from the second block to a third block of memory cells.

2. The memory system of claim 1, wherein altering the data stored to the second block comprises the processing circuitry configured to cause the memory system to:

write dummy data to the second block.

3. The memory system of claim 1, wherein the processing circuitry is further configured to cause the memory system to:

update a mapping between a logical address associated with the data and a physical address of the third block of memory cells based at least in part on moving the data from the second block to the third block.

4. The memory system of claim 3, wherein the first block is included in a superblock prior to updating the mapping between the logical address associated with the data and the physical address of the third block of memory cells, and wherein the third block of memory cells is included in the superblock based at least in part on updating the mapping between the logical address associated with the data and the physical address of the third block of memory cells.

5. The memory system of claim 4, wherein the first block of memory cells is excluded from the superblock based at least in part on updating the mapping between the logical address associated with the data and the physical address of the third block of memory cells.

6. The memory system of claim 1, wherein the first block is associated with a starting address and an ending address, and wherein to move the data from the first block to the second block, the processing circuitry is further configured to cause the memory system to:

read the data from a range of addresses beginning at the starting address and ending at the first address; and write the data read from the starting address through the first address to the second block of memory cells.

7. The memory system of claim 1, wherein the first block is associated with a starting address and an ending address, and wherein to move the data from the first block to the second block, the processing circuitry is further configured to cause the memory system to:

read the data from a range of addresses beginning at the starting address and ending at a second address immediately after the first address; and write the data read from the starting address through the second address to the second block of memory cells.

8. The memory system of claim 1, wherein moving the data from the first block to the second block comprises the processing circuitry configured to cause the memory system to:

issue a first command to read the data from the first block of memory cells; and issue a second command to write the data to the second block of memory cells.

9. The memory system of claim 1, wherein altering the data stored to the second block comprises the processing circuitry configured to cause the memory system to:

change a value of one or more bits of the data stored to the second block.

10. The memory system of claim 1, wherein the RAIN operation is performed as part of a maintenance operation performed at the memory system.

11. The memory system of claim 1, wherein the processing circuitry is further configured to cause the memory system to:

retire the first block based at least in part on moving the data from the first block to the second block.

12. The memory system of claim 1, wherein the processing circuitry is further configured to cause the memory system to:

identify the third block for storing the data from a pool of unused blocks or from an unused superblock in accordance with performing the RAIN operation on the data.

13. The memory system of claim 1, wherein the uncorrectable error in the data stored to the second block is associated with a same page as the program failure associated with the first address of the first block.

14. A memory system, comprising:

one or more memory devices; and processing circuitry coupled with the one or more memory devices and configured to cause the memory system to:

identify, as part of moving data from a source block to a first destination block of the memory system, a program failure associated with the first destination block;

write a first value to a register of the memory system based at least in part on identifying the program failure at the first destination block;

identify a second destination block for moving the data to based at least in part on writing the first value to the register of the memory system;

move the data from the source block to the second destination block based at least in part on identifying the second destination block; and update a mapping between a logical address associated with the data and a physical address of the second destination block of based at least in part on moving the data from the source block to the second destination block.

15. The memory system of claim 14, wherein the processing circuitry is further configured to cause the memory system to:

refrain from continuing to move the data from the source block to the first destination block based at least in part on identifying the program failure associated with the first destination block.

16. The memory system of claim 14, wherein the processing circuitry is further configured to cause the memory system to:

retire the first destination block based at least in part on identifying the program failure associated with the first destination block.

17. The memory system of claim 14, wherein the source block maintains a valid copy of the data after identifying the program failure associated with the first destination block.

18. The memory system of claim 14, wherein the program failure associated with the first destination block is identified during a maintenance operation performed at the memory system.

19. The memory system of claim 14, wherein moving the data from the source block to the first destination block of the memory system comprises the processing circuitry configured to cause the memory system to:

read the data from the source block; and write the data to the first destination block, wherein the program failure is identified based at least in part on writing a portion of the data to the first destination block.

20. A method by a memory system, comprising:

identifying a program failure associated with writing data to a first address of a first block of memory cells of the memory system;

moving data from the first block to a second block of memory cells based at least in part on identifying the program failure associated with writing the data to the first address of the first block;

altering the data stored to the second block to include an uncorrectable error after moving the data from the first block to the second block; and performing a redundant array of independent NAND (RAIN) operation on the altered data stored to the second block based at least in part on altering the data, the RAIN operation comprising correcting the uncorrectable error in the data stored to the second block and moving the data from the second block to a third block of memory cells.

21. The method of claim 20, wherein altering the data stored to the second block comprises:

writing dummy data to the second block.

22. The method of claim 20, further comprising:

updating a mapping between a logical address associated with the data and a physical address of the third block of memory cells based at least in part on moving the data from the second block to the third block.

23. The method of claim 22, wherein the first block is included in a superblock prior to updating the mapping between the logical address associated with the data and the physical address of the third block of memory cells, and wherein the third block of memory cells is included in the superblock based at least in part on updating the mapping between the logical address associated with the data and the physical address of the third block of memory cells.

24. The method of claim 23, wherein the first block of memory cells is excluded from the superblock based at least in part on updating the mapping between the logical address associated with the data and the physical address of the third block of memory cells.

25. The method of claim 20, wherein the first block is associated with a starting address and an ending address, wherein moving the data from the first block to the second block comprises:

reading the data from a range of addresses beginning at the starting address and ending at the first address; and writing the data read from the starting address through the first address to the second block of memory cells.

26. The method of claim 20, wherein the first block is associated with a starting address and an ending address, wherein moving the data from the first block to the second block comprises:

reading the data from a range of addresses beginning at the starting address and ending at a second address immediately after the first address; and writing the data read from the starting address through the second address to the second block of memory cells.

27. The method of claim 20, wherein moving the data from the first block to the second block comprises:

issuing a first command to read the data from the first block of memory cells; and issuing a second command to write the data to the second block of memory cells.

28. The method of claim 20, wherein altering the data stored to the second block comprises:

changing a value of one or more bits of the data stored to the second block.

29. The method of claim 20, wherein the RAIN operation is performed as part of a maintenance operation performed at the memory system.

30. The method of claim 20, further comprising:

retiring the first block based at least in part on moving the data from the first block to the second block.

31. The method of claim 20, further comprising:

identifying the third block for storing the data from a pool of unused blocks or from an unused superblock in accordance with performing the RAIN operation on the data.

32. The method of claim 20, wherein the uncorrectable error in the data stored to the second block is associated with a same page as the program failure associated with the first address of the first block.

33. A method by a memory system, further comprising:

identifying, as part of moving data from a source block to a first destination block of the memory system, a program failure associated with the first destination block;

writing a first value to a register of the memory system based at least in part on identifying the program failure at the first destination block;

identifying a second destination block for moving the data to based at least in part on writing the first value to the register of the memory system;

moving the data from the source block to the second destination block based at least in part on identifying the second destination block; and updating a mapping between a logical address associated with the data and a physical address of the second destination block of based at least in part on moving the data from the source block to the second destination block.

34. A non-transitory computer-readable medium storing code at a memory system, the code comprising instructions executable by one or more processors to:

identify a program failure associated with writing data to a first address of a first block of memory cells of the memory system;

move data from the first block to a second block of memory cells based at least in part on identifying the program failure associated with writing the data to the first address of the first block;

alter the data stored to the second block to include an uncorrectable error after moving the data from the first block to the second block; and perform a redundant array of independent NAND (RAIN) operation on the altered data stored to the second block based at least in part on altering the data, the RAIN operation comprising correcting the uncorrectable error in the data stored to the second block and moving the data from the second block to a third block of memory cells.

* * * * *